Dec. 12, 1950      E. C. HARTWIG      2,533,369
ELECTRONIC SEQUENCE TIMER

Filed Sept. 4, 1948      2 Sheets-Sheet 1

WITNESSES:
Robert C. Baird
N. C. Groome

INVENTOR
Edward C. Hartwig.
BY
Hymen Diamond
ATTORNEY

Dec. 12, 1950      E. C. HARTWIG      2,533,369
ELECTRONIC SEQUENCE TIMER

Filed Sept. 4, 1948      2 Sheets-Sheet 2

WITNESSES:
Robert C. Baird
Nw. C. Groome

INVENTOR
Edward C. Hartwig.
BY
Hymen Diamond
ATTORNEY

Patented Dec. 12, 1950

2,533,369

UNITED STATES PATENT OFFICE 2,533,369

ELECTRONIC SEQUENCE TIMER

Edward C. Hartwig, Tonawanda, N. Y., assignor to Westinghouse Electric Corporation, East Pittsburgh, Pa., a corporation of Pennsylvania Application September 4, 1948, Serial No. 47,812

17 Claims. (Cl. 315—246)

My invention relates to electric discharge apparatus and it has particular relation to apparatus for timing a succession of events, each of which is to persist for a predetermined time interval.

My invention has particular application to resistance welding. A resistance welding operation is initiated by the closing of a start switch. After the switch is closed the electrodes are engaged with the work under pressure. This event takes place during a time interval of proper length called the Squeeze interval. Following the Squeeze interval, the flow of welding current takes place during an interval which is called the Weld interval. When the flow of welding current is interrupted, the welding electrodes are maintained in engagement with the material during a so-called Hold interval until the weld hardens. The electrodes are then disengaged from the material and maintained in disengagement during a so-called Off interval so that the material may be reset for a second operation. If the welder is set for Repeat operation and the start switch is maintained closed, the above-described sequence of events is repeated a number of times and a series of welds are produced. If the welder is set for Non-repeat operation, the start switch must be reopened and reclosed after the completion of each Hold interval.

Each of the events of a welding or similar operation must occur promptly and precisely in its turn and its duration must be maintained within narrow limits. If, for example, the Weld interval is initiated before the Squeeze interval is completed, the material to be welded is burned by the premature discharge between the electrodes. If the Weld interval is too long the material may be burned, if it is too short a secure joint may not be effected. If the Hold interval is terminated prematurely, the welding electrodes in opening draw the soft welded buttons with them and punch a hole in the material. If the Off interval is terminated prematurely or too late, the welds may be too closely or too remotely spaced. The failure of a timer during one of a series of operations may have serious consequences. For example, because the metal is burned or perforated at one weld, a sheet, which been fabricated for use as a fender or as one side of an automobile, may be seriously damaged as to be scrapped. In these days of steel shortages, the scrapping of sheet metal for such reasons is no inconsequential matter.

Sequence timers constructed in accordance with the teachings of the prior art in wide use, include a plurality of electric discharge circuits for timing the various events and a plurality of electromagnetic relays actuable by the flow of current through the discharge circuits for producing the desired succession in the actuation of these circuits. These relays are actuated by the current flow through thyratrons. For economy reasons the thyratrons are of low current carrying capacity and the sequence relays are relatively light. The operation of each electromagnetic relay consumes an appreciable time interval. These intervals for the different relays are interposed between each event and the succeeding event, and the speed of operation of a welding system is limited by it. A welder is essentially a machine tool designed for carrying out many operations. The relays in the prior art sequence timer are operated many times and are subjected to unusual wear and tear. Since they are of light construction the relays soon wear out. In fact, the life of an electromagnetic sequence timer is to a large extent limited by the life of the electromagnetic relay available for sequence timer service.

A sequence timer in which sequencing electromagnetic relays are not present is shown in Overbeck Patent 2,295,601. This timer includes a plurality of tubes 20, 21, 22, 23 and 24 (Fig. 1) which are rendered conductive and non-conductive when an associated tube to the anode of which its grid is connected is rendered non-conductive. I have found that the Overbeck system operates satisfactorily for only a short time of the order of eight or ten hours. I have also found that the Overbeck system does not operate with the certainty and the precision which an operation, such as welding operation, demands.

It is accordingly an object of my invention to provide a timer devoid of sequencing electromagnetic relays for timing precisely the duration and the sequence of a plurality of events.

A more specific object of my invention is to provide a sequence timer devoid of sequencing electromagnetic relays for a welder.

Another specific object of my invention is to provide a purely electronic sequence timer.

A further object of my invention is to provide a welding system including a purely electronic welding contactor cooperatively associated with a purely electronic sequence timer.

An ancillary object of my invention is to provide an electronic timing circuit which shall be positive in its operation.

Another ancillary object of my invention is to provide novel thyratron circuits, particularly adapted to contribute to reliable sequence timing by purely electronic means.

My invention arises from the discovery that the Overbeck system operates satisfactorily for only a short time because the sequencing tubes which it includes tend to clean up; that is, the solid structure of these tubes tends to absorb their gas and convert them from gaseous tubes capable of conducting substantial current into high vacuum tubes capable of conducting current of small magnitude. I have also discovered that the clean up effect arises from the electric fields produced in these tubes by the electrode potential distribution.

For an understanding of this difficulty consider for example the graphic illustration of the operation of Overbeck's system presented in Fig. 2, axes b and c. On these axes the potentials impressed on the electrodes of tubes 22 and 23 are plotted as a function of time. The grid potential (EG—62) of tube 23 is derived from the anode of tube 22 and has the wave form and relative phase position of the anode potential (EA—37) of the latter. Between instants O and Q (Off interval) tubes 22 and 23 are conductive and therefore the gas in these tubes is ionized. The wave form of the grid potential of tube 23 is trapezoidal; at intervals of 180° the wave representing this potential has sharp corners. At these instants this potential varies sharply and the corresponding electric field change in the region of the grid is great. Since the anode potential of tube 22 is displaced by 90° with reference to the anode potential of tube 23, the grid potential of tube 23 is displaced by 90° with reference to its anode potential. The sharp variations in the grid potential of tube 23 and the resulting intense fields, therefore, occur at times when the conductivity and the ionization of tube 23 are a maximum. The potential relationship is such that the grid potential is decreasing at the instant of the intense field and maximum ionization and therefore the intense field is negative and the ions have a high acceleration toward the grid. The ions are therefore absorbed by the grid and tube 23 cleans up. The same condition exists for the other tubes.

In thyratrons of the mercury type a globule of mercury is provided. The clean up difficulty is not serious if tubes of this type are utilized. However, such tubes are costly; in addition their break-down characteristic varies severely with temperature.

My invention also arises from the realization that the Overbeck system lacks in precision because the charging and discharging of the timing capacitors of this system are not positive operations. Each of the timing capacitors is charged from the supply through the grid circuit of an associated tube when another associated tube is rendered non-conductive. Once this capacitor is charged, the first tube is not immediately rendered non-conductive. This latter event only occurs after the second tube again becomes conductive. The sequencing of the conductivity and non-conductivity of the various tubes is dependent on the relationship between the various potentials impressed in the Overbeck system and the characteristics of his tubes. The proper performance of Overbeck's system is dependent on the maintenance of the relationship between the various potentials and of the tube characteristics between relatively narrow limits.

For an understanding of the difficulty involved in the use of the Overbeck system, we may consider the operation of tubes 22 and 23 during the Squeeze interval (QR). The grid potential of tube 23 (EG—62) (Fig. 2) is determined by the charge on capacitor 87, the potential of which is in turn dependent on the potential of the anode 37 of tube 22 (EA—37). At the instant Q, when the Squeeze period is initiated, tube 22 is rendered non-conductive and the bias potential of the grid 62 of tube 23 is increased so that capacitor 87 is charged with its right-hand plate negative and its left-hand plate positive. The charging is effected in a short time interval, but tube 23 does not immediately become non-conductive. It is maintained conductive so long as tube 22 remains non-conductive, that is until the instant R. This condition persists because the half-waves of potential EG—62 rise just to the axis c. Eventually at instant R, tube 22 becomes conductive, and tube 23 is rendered non-conductive.

If the Squeeze interval is to be properly timed in Overbeck's system, the tube 22 must have at all times a characteristic such that it is fired by the voltage EG—62. If the tube characteristic should drift so that the potential is too small or if the potential should become too small, tube 22 would fail to fire, tube 23 would be prematurely rendered conductive and the Squeeze interval would be prematurely terminated. This condition is particular likely to occur when the Squeeze interval is relatively long and capacitor 87 discharges relatively slowly. There is a relatively high probability that failure of this type may occur in Overbeck's system unless the critical potentials and the tube characteristics are maintained within the narrow limits which avoidance of such failure demands. This is a costly requirement. To avoid repeated failure to produce sound welds the critical potentials and the tube characteristics of the Weld, Hold and Off timers must also be maintained within narrow limits. The above presented analysis also applies to the Weld, Hold and Off intervals which are dependent on the charging of capacitors during intervals u, v and p.

I have also realized that difficulty may arise from the fact that the control of the conductivity of each tube is effected indirectly. While a tube is conductive another tube is rendered non-conductive, a capacitor is charged from the source and later when the second tube becomes conductive the first tube becomes non-conductive. This chain of events is too indirect to be entirely reliable.

In accordance with my invention, I provide a purely electronic sequencing timer in which the control of the conductivity of the various tubes is positive. Each of the timing tubes has connected in its grid circuit a time constant network which is charged in positive manner through another of the tubes when the latter becomes conductive. When a time constant network is charged the tube which it controls is rendered non-conductive. The charging process is instantaneous, and the tube controlled responds immediately.

The tubes are supplied from an alternating current supply. When conductive they conduct only during the positive half periods of this supply and are non-conductive during the negative half periods. According to my invention the various tubes are so connected that each time constant network is charged to a biasing potential during the negative half periods of the anode-cathode potential of the tube controlled from this network.

In producing a sequence timer in which the desired precision in the change in conductivity of the tubes is attained, I encountered several complex problems. A sequence timer in accordance with my invention includes a plurality of discharge devices, several of which must be at one instant at the completion of one event rendered conductive or non-conductive in a predetermined succession. At a later instant at the completion of a second event the conductivity of one of the former tubes must be changed while the other tubes remain unaffected. I have produced the above described sequence of operations in my timer by including in it tubes each of which has a pair of grids. Such tubes are controlled from one of their grids in response to one operation and from the other grid in response to the second operation. In both cases, the control is positive.

To achieve the proper sequencing of the conductivity of the tubes included in my system, I have also provided a novel thyratron circuit. The thyratron load is in this circuit connected between the cathode and one of the terminals of the supply from which the tube is energized.

The novel features that I consider characteristic of my invention are set forth with particularity in the appended claims. The invention itself, however, both as to its organization and method of operation, together with additional objects and advantages thereof, will best be understood from the following description of a specific embodiment when read in connection with the attached drawings, in which:

Figure 1:
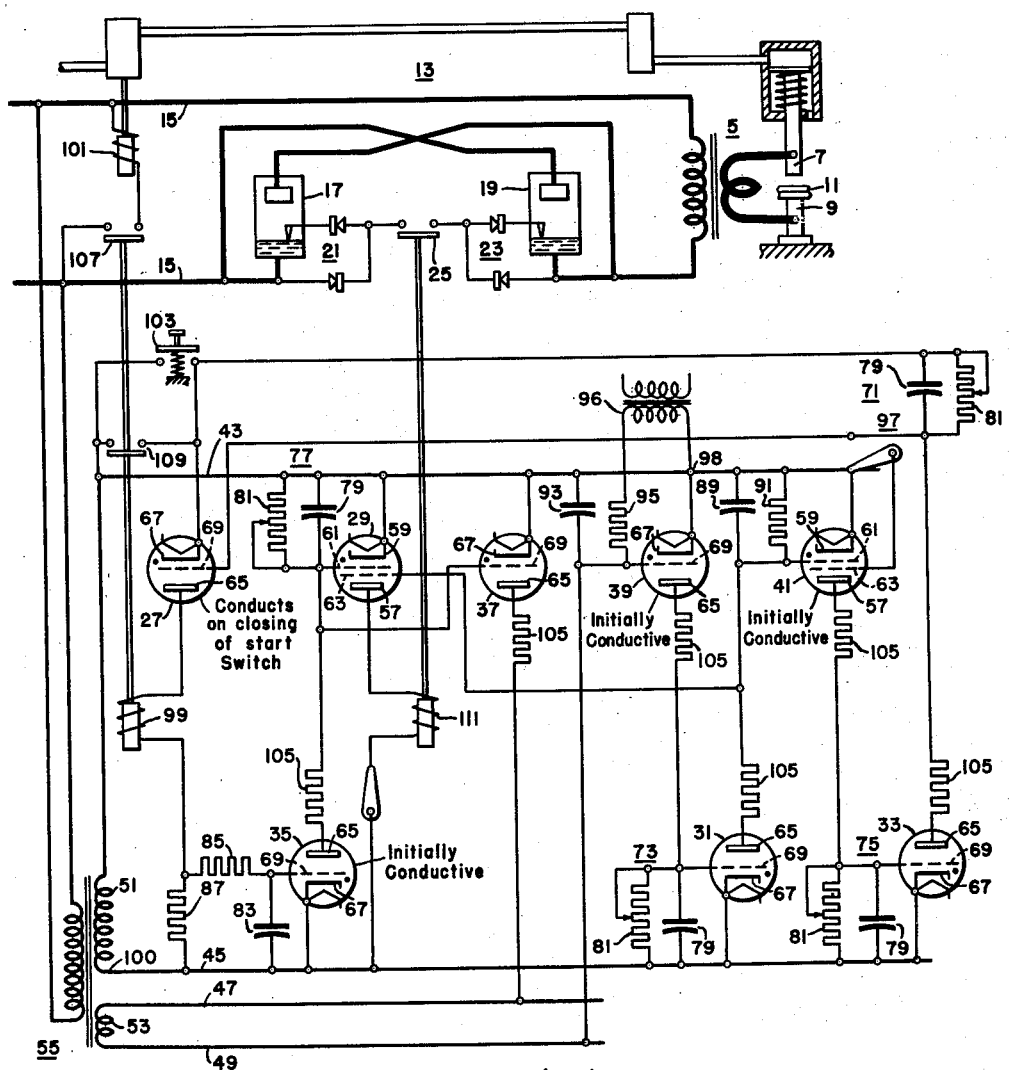
Figure 1 is a circuit diagram showing a preferred embodiment of my invention.

The apparatus shown in Fig. 1 comprises a welding transformer 5 across the secondary of which welding electrodes 7 and 9 are connected. One of these electrodes 7 may be moved into and out of engagement with the work 11 by operation of a hydraulic system 13. Power is supplied to the primary of the transformer 5 from buses 15, which may be the buses of a commercial supply of 200 to 2300 nominal voltage rating, through a pair of ignitrons 17 and 19 connected in antiparallel between the buses and the primary. Firing circuits 21 and 23 respectively are provided for the ignitrons 17 and 19. These circuits are normally open but may be closed by the operation of a contactor 25.

The operation of the welding electrodes 7 and 9 and the supply of welding current is controlled from a sequence timer devoid of sequencing electromagnetic relays. This timer determines the duration and the order of occurrence the Squeeze, Weld, Hold and Off intervals. It includes an initiating thyratron 27, Squeeze, Weld and Hold thyratrons 29, 31, and 33 respectively, and a plurality of auxiliary thyratrons 35, 37, 39 and 41 respectively. The thyratrons are supplied from auxiliary buses 43, 45, 47 and 49 respectively energized from the secondaries 51 and 53 of a transformer 55 which in turn energized from the main buses 15. The Squeeze thyratron 29 and one of the auxiliary thyratrons 41 are necessarily of the type having an anode 57, a cathode 59 and a plurality of control electrodes 61 and 63; the others may be of the same type but may be as shown of the type having an anode 65, a cathode 67 and only one control electrode 69. While the valves 27, 29, 31, 33, 35, 37, 39 and 41 are in the preferred practice of my invention thyratrons, certain or all of the valves may under some circumstances be high vacuum electric discharge devices, ignitrons or discharge devices of other types.

Between the control electrodes 69 and the cathodes 67 of the initiating thyratron 27, the Weld thyratron 31 and the Hold thyratron 33 the Off, Weld and Hold time constant networks 71, 73 and 75 respectively are connected. Between one control electrode 61 and the cathode 59 of the Squeeze thyratron 29 the Squeeze network 77 is connected. Each of these networks 71 to 77 includes a capacitor 79 shunted by a rheostat 81. The rheostat 81 may be set to determine the duration of each of the intervals. Between the control electrode 69 and the cathode 67 of the auxiliary thyratron 35 a capacitor 83 shunted by a grid resistor 85 and another resistor 87, is connected. The Squeeze network 77 is connected between the control electrode and the cathode of the auxiliary thyratron 37; a capacitor 89 shunted by a resistor 91 is connected in common between the first control electrode 61 and the cathode 59 of the auxiliary thyratron 41 and the second control electrode 63 and the cathode 61 of the Squeeze thyratron 29; and a similar network 93—95 is connected between the control electrode and the cathode of the auxiliary thyratron 39. With the Repeat non-repeat switch 97 in the Repeat position the second control electrode 63 is connected to its cathode 59; on the Non-repeat this same electrode is connected to the Off network 71. In the preferred practice of my invention capacitor-resistor time constant networks are to be preferred because of the simplicity and ready availability of their components. Systems, including time constant networks composed of inductors and resistors or of combinations of inductors, capacitors and resistors, are within the scope of my invention.

The time constant network 83—87 of the auxiliary thyratron 35 is connected in the anode circuit of the initiating thyratron 27 through the exciting coil 99 of the relay for energizing the solenoid 101 of the electrode moving system 13. This anode circuit is open at the start switch 103 and the initiating thyratron 27 is non-conductive. The Squeeze network 77 is connected in the series with the anode and cathode of the auxiliary thyratron 35 across the buses 43 and 45. Because capacitor 83 is discharged the thyratron 35 is initially conductive and capacitor 79 of the Squeeze network is charged with its upper plate (connected to control electrodes 61 and 69 of the thyratrons 29 and 37) charged negative and its lower plate (connected to the cathodes of these thyratrons) positive so that the Squeeze thyratron 29 and the auxiliary thyratron 37 are initially non-conductive. The anode of the auxiliary thyratron 37 is connected to one bus 47; the other bus 49 is connected to its cathode through the network including the capacitor 93 shunted by the resistor 95 in series with the secondary 96 of the transformer whereby the cathode heater of the thyratron 39 is heated. The junction of the capacitor 93 and resistor 95 is connected to the control electrode 69 of thyratron 39. Since the capacitor 93 is discharged the latter thyratron is conductive. The secondary 96 is so arranged that at the instants when its terminal 98 connected to the cathode 67 of the thyratron 39 is positive the terminal 100 of the main secondary 51 connected to the anode 65 of this thyratron is positive. The capacitor 93 and the resistor 95 constitute a phase shift network across this secondary. The effect of this network and the secondary 96 is to shift the control potential of thyratron 39 relative to its anode potential in such a sense and to such an extent that thyratron 39 becomes conductive approximately $\frac{1}{12}$ of a period (30°) after its anode-cathode potential becomes positive. The anode-cathode potential of thyratron 37 becomes positive at the instant when the anode-cathode potential of thyratron 39 becomes positive. Thyratron 37 however becomes conductive substantially at the instant when its anode-cathode potential becomes positive and when it does conduct it promptly changes the capacitor 93. The potential impressed on this capacitor becomes an effective bias during the $\frac{1}{12}$ cycle while thyratron 39 is non-conductive and maintains the latter non-conductive.

The Weld network 73 is connected in the anode circuit of the auxiliary thyratron 39 and since the latter is initially conductive the Weld thyratron 31 is initially non-conductive. The network 89—91 is connected in the anode circuit of the Weld thyratron and since the latter is non-conductive the auxiliary thyratron 41 is conductive. The Hold network 75 is connected in the anode circuit of the auxiliary thyratron 41 and since the latter is conductive, the Hold thyratron 75 is non-conductive. The Off network 71 is connected in the anode circuit of the Hold thyratron through the start switch 103.

The capacitors in the time constant networks are either positively charged through the anode circuits of the thyratrons or entirely discharged. In either case the control is positive. The charging is effected through anode resistors 105. With the exception of thyratron 39, the thyratron through which each time constant capacitor is charged is connected to the buses 43 and 45 oppositely to the thyratron controlled by this capacitor. For this reason the bias potential is built up during the half period when the controlled tube is not ionized. The bias on tube 39 is built up during the $\frac{1}{12}$ half period when it is non-conductive. The fields which clean up the thyratrons in Overbeck's system are therefore avoided.

To start the welding operation, the start switch 103 is closed, closing the cathode circuit of the initiating thyratron 27. This thyratron is now rendered conductive, energizing the solenoid relay 99. The circuit through the solenoid 101 is closed through a now closed contactor 107 of the solenoid relay, and fluid pressure is supplied to cause the movable welding electrode 7 to engage the work 11. The relay 99 is locked in through a now closed lock-in contactor 109.

The current flow through the initiating thyratron 27 charges the capacitor 83 of the time constant network connected in series with its anode 65. The charge is of such polarity as to impress a bias in the control circuit of the auxiliary thyratron 35 and to render the latter non-conductive. The charging current which flows to the Squeeze capacitor 79 is now interrupted, and this capacitor is discharged through its associated rheostat 81 in a time interval equal to the desired Squeeze time. At the end of this interval, the Squeeze thyratron 29 is rendered conductive. Current now flows through the exciting coil 111 of the firing relay and this relay is actuated. The contactor 25 is actuated and the ignitrons 17 and 19 are fired and conduct current through the primary of the welding transformer 5, and the material is welded.

When the Squeeze capacitor 79 is discharged the auxiliary thyratron 37 is rendered conductive and conducts current to charge the capacitor 93 in the time constant network of the auxiliary thyratron 39. The latter thyratron is rendered non-conductive after an interval predetermined by the magnitude of the resistor 95 of the time constant network 93—95 and the charging current to the Weld capacitor 79 is interrupted.

In a predetermined time interval after the interruption of this charging current, the Weld capacitor 79 discharges through its associated rheostat 81, and the Weld thyratron 31 is rendered conductive. Current now flows through the Weld thyratron to charge the capacitor 89 in the time constant network in the control circuits of the third auxiliary thyratron 41 and the Squeeze thyratron 29. When the capacitor 89 in series with the Weld thyratron 31 is charged, the third auxiliary thyratron 41 and the Squeeze thyratron are rendered non-conductive. The firing relay 111 is therefore deenergized, and the flow of current through the ignitrons 17 and 19 is interrupted.

The auxiliary thyratron 35 controlled from the initiating thyratron 27 remains non-conductive, and the first auxiliary thyratron 37 remains conductive. Therefore, in spite of the change in the conductivity of the Squeeze thyratron, the second auxiliary thyratron 39, the Weld thyratron 31 and the third auxiliary thyratron 41 remain in their last described condition, that is, the Weld thyratron 31 remains conductive and the others remain non-conductive.

When the third auxiliary thyratron 41 is rendered non-conductive, the flow of charging current to the Hold capacitor 79 in series with it, is interrupted. This capacitor now discharges through its associated rheostat 81 in a time interval equal to the desired Hold time. At the end of this interval, the Hold thyratron 33 is rendered conductive. Current now flows through the anode circuit of the Hold thyratron to charge Off capacitor 79. Once the Off capacitor is charged, the initiating thyratron 27 is rendered non-conductive releasing the relay 99 so that the electrode 7 disengages the work 11. The flow of current to the capacitor 83 in the time constant network of the auxiliary thyratron 35 is now interrupted; this capacitor discharges, and the auxiliary thyratron 35 is rendered conductive, charging the Squeeze capacitor 79. When the latter is charged, the auxiliary thyratron 37 is rendered non-conductive, the capacitor 93 in the control circuit of the second auxiliary thyratron 39 is discharged, and the latter thyratron is rendered conductive. When the auxiliary thyratron 39 conducts Weld thyratrons 31 is rendered non-conductive. The flow of charging current to the capacitor 79 in the control circuit of the third auxiliary thyratron 41 is therefore interruped, and when this capacitor discharges, this thyratron is rendered conductive charging the Hold capacitors 79 and rendering the Hold thyratron 33 non-conductive. The system is now reset for a second operation. When the Hold thyratron 33 is rendered non-conductive, the Off capacitor 79 discharges through its associated rheostat 81 and at the end of the Off time, the initiating thyratron 27 is again rendered conductive, reinitiating the operation of the system.

When the switch 97 is set for Non-repeat operation, the second control electrode 63 of the auxiliary valve 41 is connected to one terminal of the Off network 71. The other terminal of this network is connected to the cathode 59 of the auxiliary thyratron 41. The auxiliary thyratron 41 remains non-conductive and the Hold thyratron therefore remains conductive so long as the start switch 103 is closed, regardless of the condition of the Weld thyratron and its associated valves. So long as the Hold thyratron remains conductive, the Off capacitor 79 remains charged, and the initiating thyratron 27 remains non-conductive. To initiate a second welding operation, the start switch 103 must be reopened. When this event occurs, the anode circuit of the Hold thyratron 33 is opened and the charging current to the Off capacitor 79 is interrupted. After the Off capacitor discharges through its associated rheostat 81, the initiating thyratron 27 may be rendered conductive on the reclosure of the start switch 103 and another weld may be produced.

Figure 2:
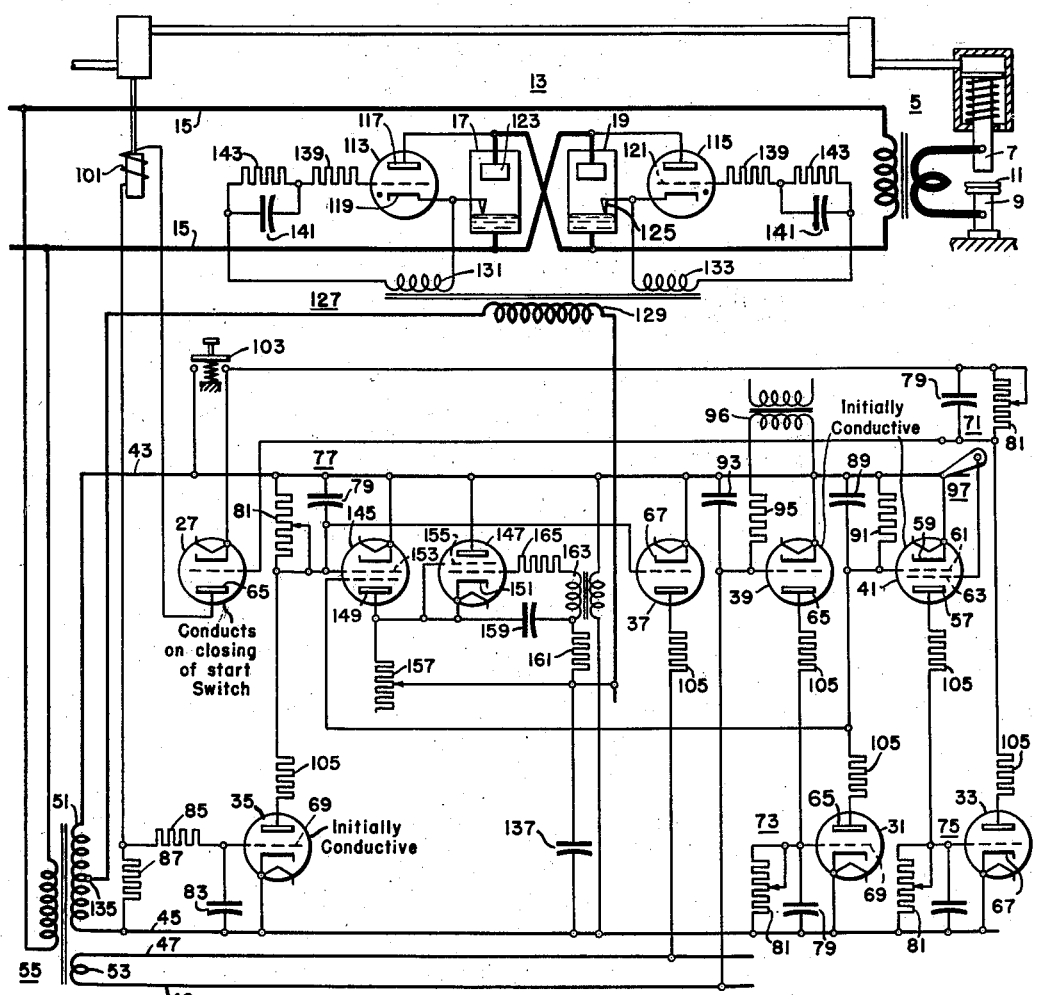
Fig. 2 is a circuit diagram of a modification of my invention.

The firing relay 111 and the air solenoid relay 99 may be constructed ruggedly and therefore may not wear as rapidly as ordinary electromagnetic relays when subjected to the numerous shocks of operation. Under certain circumstances, the elimination of these relays from the system may prove desirable. Apparatus in which this object is accomplished, is shown in Fig. 2.

In this system the ignitrons 17 and 19 which conduct the current through the primary of the welding transformer 5, are each fired through a firing thyratron 113 and 115 respectively. Each firing thyratron has an anode 117, a cathode 119 and a control electrode 121. The anodes 117 are connected to the anodes 123 of the corresponding ignitrons and the cathodes 119 to the igniters 125 of the corresponding ignitrons. Potential for controlling the firing thyratrons is derived from a control transformer 127 having a single primary 129 and a pair of secondaries 131 and 133. The primary of this transformer is connected at one terminal to an intermediate tap 135 of the secondary 51 of the main transformer 55 and at the other terminal to a capacitor 137 which is connected to the lower terminal of the secondary 51. The secondaries 131 and 133 of the control transformer are each connected between the cathode 119 and the control electrode of a firing thyratron 113 and 115 through a grid resistor 139 and a biasing network consisting of a capacitor 141 shunted by a resistor 143.

The sequence timer for this system differs from the sequence timer for the Fig. 1 system in its initiating and Squeeze circuits. The air solenoid 101 is connected directly in the anode circuit of the initiating thyratron 27. So that the air solenoid will be properly closed when the initiating thyratron becomes conductive, this thyratron must be selected to conduct the substantial current necessary for the operation of the air valve. In lieu of a single Squeeze thyratron such as 29 of the Fig. 1 system, the Fig. 2 system includes a pair of thyratrons 145 and 147 connected in antiparallel in a follow circuit. Both these thyratrons are similar to the Squeeze thyratron 29 each having an anode 149, a cathode 151, a first control electrode 153 and a second control electrode 155. The cathode of one of these thyratrons 145 and the anode 155 of the other 147 are connected to the upper terminal of the main secondary 51. The anode of the former and the cathode of the latter are connected together through a potentiometer 157 to the junction of the capacitor 137 and the primary 129 of the control transformer 127. The control electrode 153 of the first thyratron 145 is connected in to its cathode 151 through the Squeeze network 77 and the network 89—91 respectively in the same manner as the corresponding electrodes of the Fig. 1 system. Across the potentiometer 157 a capacitor 159 is connected in series with a resistor 161. This capacitor is also connected between the control electrode 153 and the cathode 151 of the second thyratron 147 through the secondary 163 of an auxiliary transformer and a grid resistor 165. The potential supplied by this secondary 163 is of such polarity that the capacitor 159 is charged through the grid circuit of the thyratron 147 in such a sense as to maintain this thyratron non-conductive so long as the first thyratron 145 is maintained non-conductive. The first thyratron is initially maintained non-conductive because initially the auxiliary thyratron 35 is conductive, and the Squeeze capacitor 79 is charged. The control electrode 155 of the second thyratron 147 is connected to its cathode. When the thyratrons 145 and 147 are non-conductive the potential impressed by the control transformer in the control circuits of the firing thyratrons 113 and 115 is approximately 190° out of phase with the potential impressed between the anodes 117 and the cathodes 119 of these thyratrons. This potential relationship is illustrated for one of the firing thyratrons 113 in Fig. 3. In this view, voltage is plotted vertically, and time horizontally. The heavy full line sign curve represents the anode potential and the lighter full line sign curve represents the control potential. The left-hand portion of the graph illustrates the situation which exists initially. Under such circumstances the control electrode 121 of the firing thyratrons 113 and 115 are positive relative to their cathodes 119 during the respective half periods during which the anode-cathode potentials are negative. During these half periods, the capacitors 141 in the biasing networks are charged as represented by the broken line curve in such a sense as to maintain the firing thyratrons non-conductive. When the start switch 103 is closed, the auxiliary thyratron 35 is rendered non-conductive because the capacitor 83 in its control network is charged. The flow of charging current to the Squeeze capacitor 79 is now interrupted. After the Squeeze interval, the first Squeeze thyratron 145 is rendered conductive. As the first Squeeze thyratron conducts, the capacitor 159 connected in parallel with the potentiometer 157, is charged in such a sense that the biasing charge impressed on the second Squeeze thyratron 147 is counteracted. The second Squeeze thyratron is therefore rendered conductive after its anode-cathode potential has become positive. The Squeeze thyratrons continue to conduct during opposite half periods of the supply until the first Squeeze thyratron 145 is rendered non-conductive after the Weld thyratron 31 is rendered conductive.

When these thyratrons 145 and 147 are conductive, they connect the potentiometer 157 to the upper terminal of the secondary 51. Under such circumstances, the capacitor 137 and the potentiometer 157 are connected in series across the secondary. The primary potential for the control transformer 127 derived between the midtap 135 of the main secondary and the junction of the potentiometer and the capacitor. When the thyratrons are conductive, the phase of the potential provided by the control transformer relative to the bus potential 15 is therefore dependent on the setting of the potentiometer 157. The firing thyratrons are now rendered conductive at instants in the half periods of the source 15 when determined by this phase relationship and therefore by the setting of the potentiometer.

Figure 3:
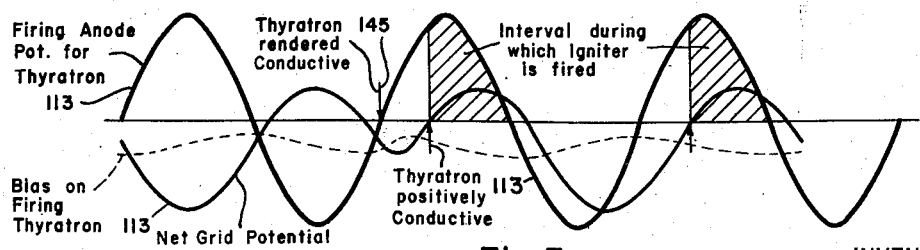
Fig. 3 is a graph illustrating the operation of the apparatus shown in Fig. 2.

This operation is illustrated in Fig. 3 in the right-hand portion of the graph. In preparing this portion of the graph, it is assumed that the first Squeeze thyratron 145 is rendered conductive at an instant corresponding to the position of the first arrow of Fig. 3. The control potential impressed on the left-hand firing thyratron 113 now has the wave form represented in the right-hand portion of Fig. 3. This potential becomes positive at an instant in the half period of the source corresponding to the position of the second arrow, and at this instant renders the firing thyratron 113 conductive. When the other Squeeze thyratron is rendered conductive, potential of the opposite polarity appears across the primary 129 of the control transformer, and the other firing thyratron 115 is rendered conductive at a corresponding instant. When the firing thyratrons conduct, the corresponding ignitrons are rendered conductive and current of a magnitude predetermined by the setting of the potentiometer flows through the primary of the welding transformer.

The sequence timer for the Fig. 2 system is similar to the sequence timer for the Fig. 1 system with the exceptions that the initiating thyratron 27 of the former may have a greater current carrying capacity than that of the latter, and the former includes antiparallel connected Squeeze thyratrons 145 and 147 in lieu of a single thyratron 29. The above description of the structure and operation of the Fig. 1 system therefore also applies to the Hold and Off portions of the Fig. 2 system.

Although I have shown and described certain specific embodiments of my invention, I am fully aware that many modifications thereof are possible. My invention therefore is not to be restricted except in so far as is necessitated by the prior art and by the spirit of the appended claims.

I claim as my invention:

1. In combination a first thyratron having an anode, a cathode and a control electrode, connections to said control electrode for controlling the conductivity of said first thyratron, a second thyratron having an anode, a cathode, a first control electrode and a second control electrode, connections between the anode and cathode of said first thyratron and said first control electrode, a third thyratron having an anode and a cathode, connections to said third thyratron for controlling the conductivity thereof and connections between said anode and cathode of said third thyratron and said second control electrode.

2. In combination a first thyratron having an anode, a cathode and a control electrode, connections to said control electrode for controlling the conductivity of said first thyratron, a second thyratron having an anode, a cathode, a first control electrode and a second control electrode, connections between the anode and cathode of said first thyratron and said first control electrode, a third thyratron having an anode and a cathode, connections to said third thyratron responsive to the conductivity of said first thyratron for controlling and conductivity thereof and connections between said anode and cathode of said third thyratron and said second control electrode.

3. In combination a first thyratron having an anode, a cathode and a control electrode, connections to said control electrode for controlling the conductivity of said first thyratron, a second thyratron having an anode, a cathode, a first control electrode and a second control electrode, connections between the anode and cathode of said first thyratron and said first control electrode, a third thyratron having an anode and a cathode, connections to said third thyratron responsive to the conductivity of said second thyratron for controlling the conductivity thereof and connections between said anode and cathode of said third thyratron and said second control electrode.

4. In combination a first terminal and a second terminal for supplying power, a first thyratron having an anode, a cathode and a control electrode, connections between said anode and said first terminal and said cathode and said second terminal, a time constant network including a capacitor shunted by a resistor, circuit components connecting said network between said control electrode and said cathode, a second thyratron having an anode, a cathode and a control electrode, connections to said last-named control electrode for controlling the conductivity of said second thyratron, connections between said cathode of said second thyratron and said first terminal and connections between said anode of said second thyratron and said control electrode of said first thyratron.

5. In combination a first terminal, a second terminal and a third terminal for supplying power, a first thyratron having an anode, a cathode and a control electrode, connections between said anode and said first terminal and said cathode and said second terminal, a time constant network including a capacitor shunted by a resistor, circuit components connecting said network between said control electrode and said cathode, a second thyratron having an anode, a cathode and a control electrode, connections to said last-named control electrode for controlling the conductivity of said second thyratron, connections between said cathode of said second thyratron and said first terminal, connections between said anode of said second thyratron and said control electrode of said first thyratron, a third thyratron having an anode, a cathode and a control electrode, connections between said anode and said third terminal, connections between said cathode and said second terminal and connections between said control electrode of said third thyratron and said control electrode of said first thyratron.

6. A timer for timing a sequence of events including electric discharge devices each having a control electrode and a plurality of principal electrodes, the events being initiated and terminated by changing the conductivity of certain of said electric discharge devices, said timer also including energy storage components and components for discharging said storage components between the control electrode and principal electrode of each of said devices; said timer being characterized by the fact that said storage components are charged by current flowing between the anode and cathodes of corresponding ones of said discharge devices when said devices are rendered conductive.

7. A timer for timing a sequence of events including electric discharge devices each having a control electrode and a plurality of principal electrodes, the events being initiated and terminated by changing the conductivity of certain of said electric discharge devices, said timer also including energy storage components and components for discharging said storage components between the control electrodes and principal electrodes of each of certain of said devices; said timer being characterized by the fact that a pair of said electric discharge devices are connected in antiparallel, the conductivity of one of said last-named devices being controlled from one of said storage components and the other of said last-named devices being connected to said one device to be rendered conductive if said one device is rendered conductive.

8. In combination an electronic contactor including a pair of ignitrons connected in antiparallel, a timer for timing a sequence of events, one of which is the time interval during which said contactor is conductive, said timer including, terminals for supplying power and a pair of electric discharge devices connected in antiparallel between a pair of said terminals, and connections between said devices and said ignitrons for controlling the conductivity of each of said ignitrons in response to the conductivity of a corresponding one of said discharge devices.

9. In combination a first terminal and a second terminal for supplying power; a first discharge device having an anode, a cathode and a control electrode; connections between said anode and said first terminal; connections between said cathode and said second terminal; a time constant network including a capacitor connected between said control electrode and said cathode; a second discharge device having an anode, a cathode and a control electrode; connections between said last-named anode and said second terminal; connections between said last-named cathode and said first terminal; connections between said terminals and said last-named control electrode for maintaining said second device non-conductive; connections between said first device and said control electrode for rendering said second device conductive when said first device is conductive; a third electric discharge device having an anode and a cathode; connections between said last-named anode and the control electrode of said first device; connections between said last-named cathode and said first terminal and circuit components connected to said third device for controlling the conductivity thereof.

10. In combination a first terminal and a second terminal for supplying power; a first discharge device having a first main electrode, a second main electrode and a control electrode; connections between said first main electrode and said first terminal; connections between said second main electrode and said second terminal; a time constant network including a capacitor connected between said control electrode and said second main electrode; a second discharge device having a first main electrode, a second main electrode and a control electrode; connections between said last-named first main electrode and said second terminal; connections between said last-named second main electrode and said first terminal; connections between said terminals and said last-named control electrode for maintaining said second device non-conductive; connections between said first device and said control electrode for rendering said second device conductive when said first device is conductive; a third electric discharge device having a first main electrode and a second main electrode; connections between said last-named first main electrode and the control electrode of said first device; connections between said last-named second main electrode and said first terminal and circuit components connected to said third device for controlling the conductivity thereof.

11. In combination a first terminal and a second terminal for supplying power; a first discharge device having an anode, a cathode and a control electrode; connections between said anode and said first terminal; connections between said cathode and said second terminal; a time constant network including a capacitor connected between said control electrode and said cathode; a second discharge device having an anode, a cathode and a control electrode; connections between said last-named anode and said second terminal; connections between said last-named cathode and said first terminal; connections between said terminals and said last-named control electrode for maintaining said second device non-conductive; connections between said first device and said control electrode for rendering said second device conductive when said first device is conductive; a third electric discharge device having an anode and a cathode; connections between said last-named anode and the control electrode of said first device; connections between said last-named cathode and said first terminal and circuit components connected to said third device for controlling the conductivity thereof, said connections between said anode of said first device and said first terminal and said cathode of said second device and said first terminal including in common a capacitor.

12. In combination a thyratron having an anode, a cathode, a first grid and a second grid; a time constant network including a charge storing component connected between said first grid and said cathode; connections for charging said component to maintain said thyratron non-conductive, said connections including a switch to be opened to interrupt said charging and to render said thyratron conductive; a second time constant network including a charge storing component connected between said second grid and said cathode and connections for charging said last-named component to render said thyratron non-conductive after it has been rendered conductive.

13. In combination a thyratron having an anode, a cathode, a first grid and a second grid, a first time constant network connected between said first grid and said cathode and a second time constant network connected between said second grid and said cathode.

14. In combination a first thyratron having an anode, a cathode, a first grid and a second grid; a second thyratron having an anode, a cathode and a grid; connections to said first grid of said first thyratron and said grid of said second thyratron for rendering said first and second thyratrons conductive, and connections responsive to the conductivity of said second thyratron, to the second grid for rendering said first thyratron non-conductive after said second thyratron becomes conductive.

15. In combination in a sequence timer, a first thyratron having an anode and cathode; a first network consisting of a resistor in parallel with a capacitor connected to the anode of said first thyratron; a second thyratron having an anode, a cathode and a grid; a connection between the anode of the first thyratron and the grid of the second thyratron; a second network consisting of a resistor in parallel with a capacitor connected to the anode of said second thyratron; a third thyratron having an anode, cathode and grid; a connection between the anode of the second thyratron and the grid of the third; a third network consisting of a resistor in parallel with a capacitor connected to the anode of said third thyratron; a fourth thyratron having an anode, cathode and grid; a connection between the anode of the third thyratron and the grid of the fourth and a fourth network consisting of a resistor in parallel with a capacitor connected to the anode of said fourth thyratron.

16. In combination in a sequence timer, a first electric discharge device having an anode and cathode; a first network consisting of a resistor in parallel with a capacitor connected to the anode of said electric discharge device; a second electric discharge device having an anode, a cathode and a grid; a connection between the anode of the first electric discharge device and the grid of the second electric discharge device; a second network consisting of a resistor in parallel with a capacitor connected to the anode of said second electric discharge device; a third electric discharge device having an anode, cathode and grid, a connection between the anode of the second electric discharge device and the grid of the third; a third network consisting of a resistor in parallel with a capacitor connected to the anode of said third electric discharge device; a fourth electric discharge device having an anode, cathode and grid; a connection between the anode of the third electric discharge device and the grid of the fourth and a fourth network consisting of a resistor in parallel with a capacitor connected to the anode of said fourth electric discharge device.

17. In combination in a sequence timer, a first terminal; a second terminal; a first electric discharge device having an anode and cathode; a connection between said first terminal and said cathode; a first network consisting of a resistor in parallel with a capacitor connected between the anode of said first discharge device and said second terminal; a second electric discharge device having an anode, a cathode and a grid; a connection between said second terminal and said cathode of said second device; a connection between the anode of the first electric discharge device and the grid of the second electric discharge device; a second network consisting of a resistor in parallel with a capacitor connected between said anode of said second device and said first terminal; a third electric discharge device having an anode, cathode and grid; a connection between said first terminal and said cathode of said third device; a connection between the anode of the second electric discharge device and the grid of the third; a third network consisting of a resistor in parallel with a capacitor connected between said anode of said third device and said second terminal; a fourth electric discharge device having an anode, cathode and grid; a connection between said second terminal and said cathode of said second device; a connection between the anode of the third electric discharge device and the grid of the fourth and a fourth network consisting of a resistor in parallel with a capacitor connected between said anode of said fourth device and said first terminal.

EDWARD C. HARTWIG.

REFERENCES CITED

The following references are of record in the file of this patent:

UNITED STATES PATENTS

| Number | Name | Date |
| --- | --- | --- |
| 2,279,311 | Gross | Apr. 14, 1942 |
| 2,295,601 | Overbeck | Sept. 15, 1942 |
| 2,463,318 | Schneider | Mar. 1, 1949 |